US012781839B2

(12) United States Patent
Norberg

(10) Patent No.: US 12,781,839 B2
(45) Date of Patent: Nov. 3, 2026

(54) POWERTRAIN AND A VEHICLE

(71) Applicant: VOLVO TRUCK CORPORATION, Gothenburg (SE)

(72) Inventor: Sven Norberg, Hisings Backa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/249,133

(22) Filed: Jun. 25, 2025

(65) Prior Publication Data

US 2026/0009456 A1 Jan. 8, 2026

(30) Foreign Application Priority Data

Jul. 8, 2024 (EP) .................................... 24187160

(51) Int. Cl.

| | |
|---|---|
| ***B60K 1/02*** | (2006.01) |
| ***B60K 17/08*** | (2006.01) |
| ***B60K 17/16*** | (2006.01) |
| ***F16H 37/08*** | (2006.01) |

(52) U.S. Cl.

CPC ............ *F16H 37/082* (2013.01); *B60K 1/02* (2013.01); *B60K 17/08* (2013.01); *B60K 17/165* (2013.01); *F16H 37/0806* (2013.01); *F16H 2200/0021* (2013.01); *F16H 2200/0043* (2013.01); *F16H 2200/2007* (2013.01)

(58) Field of Classification Search

CPC ......... F16H 2200/2007; F16H 3/54–58; F16H 3/091–093; F16H 2200/0021; F16H 2200/0043; B60K 17/08; B60K 17/046; B60K 17/16–165; B60K 1/00–02

See application file for complete search history.

(56) References Cited

U.S. PATENT DOCUMENTS

| | | | | |
|---|---|---|---|---|
| 5,447,478 A * | 9/1995 | Braun | .................. | F16H 37/042 475/282 |
| 11,400,807 B2 * | 8/2022 | Chopra | ................ | B60K 17/046 |
| 2013/0345010 A1 * | 12/2013 | Kaltenbach | ............ | B60K 6/547 475/5 |

(Continued)

FOREIGN PATENT DOCUMENTS

| | | |
|---|---|---|
| CN | 115534647 A | 12/2022 |
| DE | 102018005947 A1 | 1/2020 |

(Continued)

OTHER PUBLICATIONS

Extended European Search Report in corresponding European Application No. 24187160.7 dated Dec. 13, 2024 (17 pages).

(Continued)

*Primary Examiner* — Ernesto A Suarez
*Assistant Examiner* — Lillian T Nguyen
(74) *Attorney, Agent, or Firm* — Jeffri A. Kaminski; Venable LLP

(57) ABSTRACT

A powertrain for a vehicle has a first power unit, a first primary reduction gearset, a first planetary gearset, shiftable between at least two gear states, comprising a direct gear state with a 1:1 speed ratio and a speed reduction gear state, a first secondary reduction gearset, a second planetary gearset, shiftable between at least two gear states, comprising a direct gear state with a 1:1 speed ratio and at least one speed reduction gear state, and at least one drive shaft, preferably two half-shafts.

15 Claims, 3 Drawing Sheets

(56) References Cited

U.S. PATENT DOCUMENTS

| | | | |
|---|---|---|---|
| 2019/0078672 A1 | 3/2019 | Duan et al. | |
| 2022/0082166 A1 | 3/2022 | Vincon et al. | |

FOREIGN PATENT DOCUMENTS

| | | | | |
|---|---|---|---|---|
| DE | 102023104451 A1 * | 10/2023 | | B60K 1/02 |
| DE | 102022204851 A1 | 11/2023 | | |
| DE | 102022213187 A1 | 6/2024 | | |
| DE | 102023130930 A1 * | 5/2025 | | F16H 37/046 |
| WO | 2020037233 A1 | 2/2020 | | |

OTHER PUBLICATIONS

"Innovative electric axle solutions for heavy duty trucks"; AVL's expertise in developing modular e-axles provides automakers with tailored and highly efficient solutions; https://www.avl.com/en/webinars/innovative-electric-axle-solutions-heavy-duty-trucks; 6 pages.

* cited by examiner

POWERTRAIN AND A VEHICLE

TECHNICAL FIELD

The disclosure relates generally to powertrains. In particular aspects, the disclosure relates to a powertrain for a vehicle, and a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A powertrain for a vehicle typically comprises an internal combustion engine and a transmission which is adapted to transfer power at different speed ratios from the internal combustion engine to drive wheels. However, due to the electrification trend, there is also a need to develop transmissions for transferring power between an electric motor/generator and drive wheels. To this end, shiftable transmissions may not always be required for electric vehicles, such as for electric passenger cars. However, for larger and heavier electric vehicles, such as trucks, buses and construction equipment, it may be beneficial to use a shiftable transmission.

In view of the above, there is a strive to develop improved technology relating to powertrains with shiftable transmissions for vehicles, in particular electric vehicles.

SUMMARY

According to a first aspect of the disclosure, a powertrain for a vehicle is provided. The powertrain comprises:

a first power unit, a first primary reduction gearset, a first planetary gearset, shiftable between at least two gear states, comprising a direct gear state with a 1:1 speed ratio and a speed reduction gear state, a first secondary reduction gearset, a second planetary gearset, shiftable between at least two gear states, comprising a direct gear state with a 1:1 speed ratio and at least one speed reduction gear state, at least one drive shaft, preferably two half-shafts, wherein the first power unit is drivingly connected to the first primary reduction gearset downstream from the first power unit, wherein the first primary reduction gearset is drivingly connected to the first planetary gearset downstream from the first primary reduction gearset, wherein the first planetary gearset is drivingly connected to the first secondary reduction gearset downstream from the first planetary gearset, wherein the first secondary reduction gearset is drivingly connected to the second planetary gearset downstream from the first secondary reduction gearset, wherein the second planetary gearset is drivingly connected to the at least one drive shaft downstream from the second planetary gearset, wherein the at least one drive shaft and the second planetary gearset are coaxially arranged and configured to rotate with respect to a common rotational axis, and wherein the powertrain is configured such that a first geometrical sectional plane which is perpendicular to the common rotational axis extends through the first power unit and the first secondary reduction gearset.

The first aspect of the disclosure may seek to provide an improved powertrain for a vehicle, in particular an electric vehicle, which is compact and provides favorable speed ratios from the first power unit to the at least one drive shaft. A technical benefit may include that a compact transmission arrangement is provided which can be shifted between at least four different "gears" or speed ratios. This may result in improved efficiency of the vehicle, i.e., a more favorable speed ratio may be selected for a specific driving situation. For example, by positioning the first power unit and the first secondary reduction gearset as disclosed herein, the extension of the powertrain, as seen along a direction which is parallel to the common rotational axis, may be reduced. This may result in an improved packaging of the powertrain in the vehicle.

A reduction gearset as disclosed herein means a gearset which is adapted to provide a speed reduction, i.e., as seen from an input side to an output side of the reduction gearset.

Optionally in some examples, including in at least one preferred example, a respective rotational axis of any one of, preferably each one of, the first power unit and the first planetary gearset is parallel to the common rotational axis. A technical benefit may include that a more compact powertrain is provided.

Optionally in some examples, including in at least one preferred example, the first primary reduction gearset comprises at least two drivingly connected gearwheels which are arranged in a common first primary gear plane which is perpendicular to the common rotational axis, and/or the first secondary reduction gearset comprises at least two drivingly connected gearwheels which are arranged in a common first secondary gear plane which is perpendicular to the common rotational axis. A technical benefit may include that a more compact powertrain is provided.

Optionally in some examples, including in at least one preferred example, the first primary reduction gearset is configured such that a constant non-shiftable speed reduction is provided from the first power unit to the first planetary gearset, and/or the first secondary reduction gearset is configured such that a constant non-shiftable speed reduction is provided from the first planetary gearset to the second planetary gearset. A technical benefit may include that a favorable speed reduction is achieved in a cost-effective manner.

Optionally in some examples, including in at least one preferred example, the at least two drivingly connected gearwheels of the first primary reduction gearset comprises a first primary reduction gearset first gearwheel drivingly connected to a first primary reduction gearset second gearwheel, the first primary reduction gearset second gearwheel being arranged downstream from the first primary reduction gearset first gearwheel, and the first planetary gearset is arranged concentric with and at least partly radially inside a radially outer periphery of the first primary reduction gearset second gearwheel. A technical benefit may include that a more compact powertrain is provided. Additionally, or alternatively, the first planetary gearset may be arranged concentric with and at least partly axially overlapping the first primary reduction gearset second gearwheel.

Optionally in some examples, including in at least one preferred example, the first planetary gearset comprises a sun gearwheel, a planet carrier carrying a plurality of planet gearwheels, and a ring gearwheel, wherein the ring gearwheel is attached to the first primary reduction gearset second gearwheel, or the ring gearwheel and the first primary reduction gearset second gearwheel are configured in one common single piece. A technical benefit may include that a compact powertrain is provided in a cost-effective manner.

Optionally in some examples, including in at least one preferred example, the first planetary gearset comprises a sun gearwheel, a planet carrier carrying a plurality of planet gearwheels, and a ring gearwheel, wherein the first planetary gearset is configured to be shiftable between the at least two gear states by selectively engaging and disengaging the sun gearwheel of the first planetary gearset to a housing. A technical benefit may include that a favorable speed reduction is provided, e.g., a favorably small speed reduction compared to any further speed reduction downstream the powertrain. For example, it has been realized that it may be more preferred to have larger speed reductions further downstream the powertrain.

Optionally in some examples, including in at least one preferred example, the powertrain further comprises a first gear engaging member for shifting the first planetary gearset between the at least two gear states, wherein the first gear engaging member is at least partly located radially inside a radially outer periphery of the sun gearwheel, or wherein the first gear engaging member is located axially offset from the sun gearwheel. A technical benefit of locating the first gear engaging member axially offset from the sun gearwheel may include that a cost-effective configuration is achieved. A technical benefit of locating the first gear engaging member radially inside the radially outer periphery of the sun gearwheel may include that a more compact powertrain is provided.

Optionally in some examples, including in at least one preferred example, the powertrain further comprises a differential gearset drivingly connected to the at least one drive shaft and to the second planetary gearset, and provided downstream the second planetary gearset and upstream from the at least one drive shaft, wherein the at least one drive shaft, the second planetary gearset and the differential gearset are coaxially arranged and configured to rotate with respect to the common rotational axis. A technical benefit may include that a compact powertrain with a differential gearset is provided.

Optionally in some examples, including in at least one preferred example, the power unit comprises a stator arrangement, and the powertrain is configured such that the first geometrical sectional plane extends through the stator arrangement and the first secondary reduction gearset. A technical benefit may include that a more compact powertrain is provided.

Optionally in some examples, including in at least one preferred example, the stator arrangement comprises a stator body and end windings arranged on opposite axial ends of the stator body, wherein the powertrain is configured such that the first geometrical sectional plane extends through the stator body or through the end windings at one of the axial ends. A technical benefit may include that a more compact powertrain is provided.

Optionally in some examples, including in at least one preferred example, the powertrain further comprises a second power unit, a second primary reduction gearset, and a second secondary reduction gearset, wherein the second power unit is drivingly connected to the second primary reduction gearset downstream from the second power unit, wherein the second primary reduction gearset is drivingly connected to the second secondary reduction gearset downstream from the second primary reduction gearset, wherein the second secondary reduction gearset is drivingly connected to the second planetary gearset downstream from the second secondary reduction gearset, and wherein the powertrain is configured such that a second geometrical sectional plane extends through the second power unit and the second secondary reduction gearset. A technical benefit may include that a more compact powertrain with a first and a second power unit is provided.

Optionally in some examples, including in at least one preferred example, the second primary reduction gearset is configured to provide a constant non-shiftable speed reduction, and/or the second secondary reduction gearset is configured to provide a constant non-shiftable speed reduction. A technical benefit may include that a favorable speed reduction is achieved in a cost-effective manner.

Optionally in some examples, including in at least one preferred example, the second primary reduction gearset comprises at least two drivingly connected gearwheels which are arranged in a common second primary gear plane which is perpendicular to the common rotational axis, and/or the second secondary reduction gearset comprises at least two drivingly connected gearwheels which are arranged in a common second secondary gear plane which is perpendicular to the common rotational axis. A technical benefit may include that a more compact powertrain is provided.

Optionally in some examples, including in at least one preferred example, the powertrain further comprises a third planetary gearset, wherein the second primary reduction gearset is drivingly connected to the third planetary gearset downstream from the second primary reduction gearset, and wherein the third planetary gearset is drivingly connected to the second secondary reduction gearset downstream from the third planetary gearset. The third planetary gearset may be shiftable between at least two gear states, comprising a direct gear state with a 1:1 speed ratio and a speed reduction gear state. A technical benefit of the third planetary gearset may include that more (a) favorable speed ratio(s) from the second power unit to the at least one drive shaft is provided.

Optionally in some examples, including in at least one preferred example, the at least two drivingly connected gearwheels of the second primary reduction gearset comprises a second primary reduction gearset first gearwheel drivingly connected to a second primary reduction gearset second gearwheel, the second primary reduction gearset second gearwheel being arranged downstream from the second primary reduction gearset first gearwheel, and the third planetary gearset is arranged concentric with and at least partly radially inside a radially outer periphery of the second primary reduction gearset second gearwheel. A technical benefit may include that a more compact powertrain is provided. Additionally, or alternatively, the third planetary gearset may be arranged concentric with and at least partly axially overlapping the second primary reduction gearset second gearwheel.

Optionally in some examples, including in at least one preferred example, a respective rotational axis of any one of, preferably each one of, the second power unit and the third planetary gearset is parallel to the common rotational axis. A technical benefit may include that a more compact powertrain is provided.

Optionally in some examples, including in at least one preferred example, the first secondary reduction gearset and the second secondary reduction gearset share a common gearwheel, and/or are provided in a common gear plane. A technical benefit may include that a more compact and/or cost-effective powertrain configuration is provided.

Optionally in some examples, including in at least one preferred example, the first power unit is an electric motor/generator and/or the second power unit is an electric motor/generator.

The terms downstream and upstream as used herein relate to a direction of a torque path from a the first/second power unit(s) to the at least one drive shaft. Accordingly, downstream means that something is provided further down in the aforementioned direction and upstream means that something is provided further up in the aforementioned direction.

According to a second aspect of the disclosure, a vehicle is provided. The vehicle comprises a powertrain according to any one of the examples of the first aspect of the disclosure. Advantages and technical benefits of the second aspect of the disclosure are analogous to the advantages and technical benefits of the first aspect of the disclosure.

Optionally in some examples, including in at least one preferred example, the common rotational axis is extending in a direction along a transverse direction of the vehicle. A technical benefit may include that a more compact powertrain packaging is achieved in the vehicle.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

Figure 1:
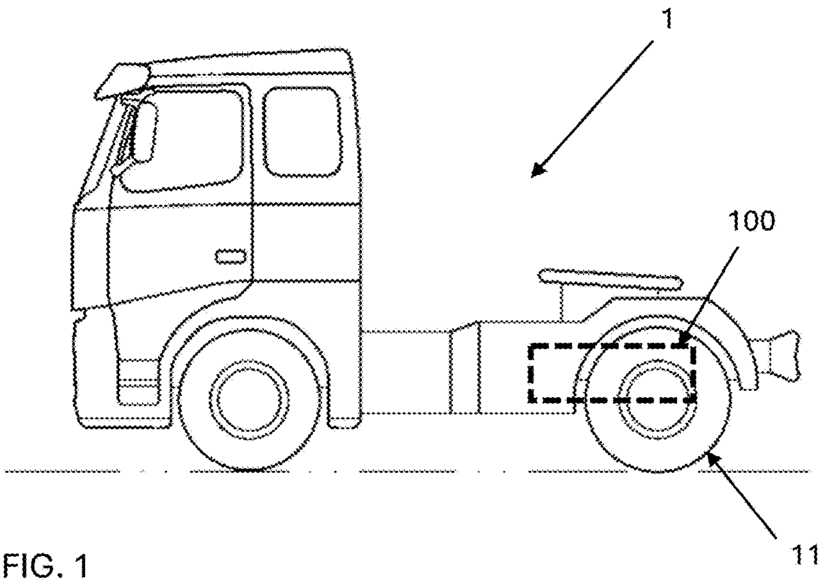
FIG. 1 is an exemplary vehicle in a side view according to an example.

The drawings are not necessarily drawn to scale. It shall also be noted that some details in the drawings may be exaggerated in order to better describe and illustrate the particular example. Like reference characters refer to like elements throughout the description, unless expressed otherwise. Some reference characters may have been omitted in some of the drawings for clarity.

DETAILED DESCRIPTION

The detailed description set forth below provides information and examples of the disclosed technology with sufficient detail to enable those skilled in the art to practice the disclosure.

An aim of the present disclosure is to provide an improved powertrain for a vehicle which at least partly alleviates one or more drawbacks of the prior art, or which at least provides a suitable alternative. Other aims of the present disclosure are to provide an improved vehicle, which at least partly alleviate one or more drawbacks of the prior art, or which at least provide suitable alternatives. The powertrain as disclosed herein may seek to provide a compact, cost-effective and efficient powertrain for a vehicle. The configuration of the powertrain as disclosed herein has shown to be advantageous for vehicle powertrains, such as for fully or at least partially electric powertrains. By way of example, by the present disclosure, a compact powertrain may be provided which can be shifted between at least four different "gears" or speed ratios. This may result in improved driving efficiency of the vehicle, i.e., a more favorable speed ratio may be selected for a specific driving situation.

FIG. 1 is an exemplary vehicle 1 in a side view according to an example. The vehicle 1 is herein a heavy-duty truck, and more particularly a towing truck for towing one or more trailers (not shown). It shall however be noted that the present disclosure is applicable to any other vehicle, such as any other truck, a bus, a passenger car, construction equipment, such as a wheel loader, an excavator, a dump truck etc.

The vehicle 1 may as shown comprise a powertrain 100 according to examples of the present disclosure. The powertrain 100 comprises a power unit (not shown) which is drivingly connected to drive wheels 11. More detailed examples of the powertrain 100 will be described in the below. The drive wheels 11 are in this example rear wheels of the vehicle 1. It shall however be noted that drive wheels may be provided at any other location, such as at the front of the vehicle. In other examples, drive wheels may be used for driving crawler members of the vehicle, e.g., of an excavator.

Figure 2:
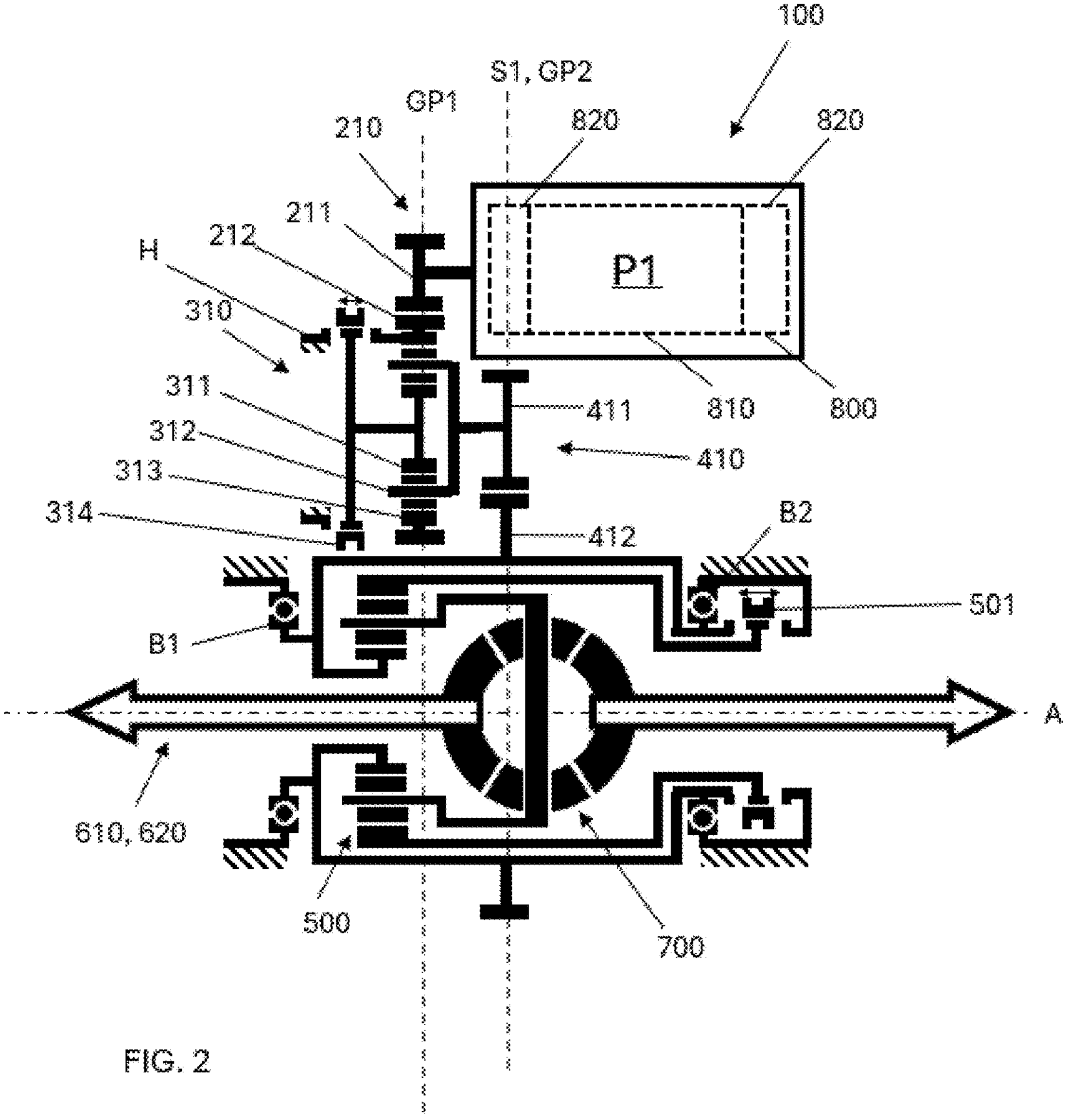
FIG. 2 is an exemplary powertrain in a schematic view according to an example.

FIG. 2 depicts an exemplary powertrain 100 in a schematic view according to an example, which for example may form part of the vehicle 1 shown in FIG. 1.

The powertrain 1 comprises a first power unit P1. The first power unit P1 is preferably an electric motor/generator.

The powertrain 1 further comprises:

- a first primary reduction gearset 210,
- a first planetary gearset 310, shiftable between at least two gear states, comprising a direct gear state with a 1:1 speed ratio and a speed reduction gear state,
- a first secondary reduction gearset 410,
- a second planetary gearset 500, shiftable between at least two gear states, comprising a direct gear state with a 1:1 speed ratio and at least one speed reduction gear state, and
- at least one drive shaft 610, 620, preferably two half-shafts 610, 620.

The first power unit P1 is drivingly connected to the first primary reduction gearset 210 downstream from the first power unit P1.

The first primary reduction gearset 210 is drivingly connected to the first planetary gearset 310 downstream from the first primary reduction gearset 210.

The first planetary gearset 310 is drivingly connected to the first secondary reduction gearset 410 downstream from the first planetary gearset 310.

The first secondary reduction gearset 410 is drivingly connected to the second planetary gearset 500 downstream from the first secondary reduction gearset 410.

The second planetary gearset 500 is drivingly connected to the at least one drive shaft 610, 620 downstream from the second planetary gearset 500.

The at least one drive shaft 610, 620 and the second planetary gearset 500 are coaxially arranged and configured to rotate with respect to a common rotational axis A.

In addition, the powertrain 100 is configured such that a first geometrical sectional plane S1 which is perpendicular to the common rotational axis A extends through the first power unit P1 and the first secondary reduction gearset 410.

As shown in FIG. 2, a respective rotational axis of any one of, such as each one of, the first power unit P1 and the first planetary gearset 310 is preferably parallel to the common rotational axis A.

As shown in FIG. 2, the first primary reduction gearset 210 may comprise at least two drivingly connected gearwheels 211, 212 which are arranged in a common first primary gear plane GP1 which is perpendicular to the common rotational axis A, and/or the first secondary reduction gearset 410 may comprise at least two drivingly connected gearwheels 411, 412 which are arranged in a common first secondary gear plane GP2 which is perpendicular to the common rotational axis A.

As further shown in FIG. 2, the first primary reduction gearset 210 may be configured such that a constant non-shiftable speed reduction is provided from the first power unit P1 to the first planetary gearset 310, and/or the first secondary reduction gearset 410 may be configured such that a constant non-shiftable speed reduction is provided from the first planetary gearset 310 to the second planetary gearset 500.

In the example shown in FIG. 2, the at least two drivingly connected gearwheels 211, 212 of the first primary reduction gearset 210 comprises a first primary reduction gearset first gearwheel 211 drivingly connected to a first primary reduction gearset second gearwheel 212. The first primary reduction gearset second gearwheel 212 is arranged downstream from the first primary reduction gearset first gearwheel 211, and the first planetary gearset 310 is arranged concentric with and at least partly radially inside a radially outer periphery of the first primary reduction gearset second gearwheel 212. In other non-limiting examples, the first planetary gearset 310 may be arranged concentric with and at least partly axially outside the first primary reduction gearset second gearwheel 212.

As further shown in FIG. 2, the first planetary gearset 310 may comprise a sun gearwheel 311, a planet carrier 312 carrying a plurality of planet gearwheels, and a ring gearwheel 313. By way of example, the ring gearwheel 313 may be attached to the first primary reduction gearset second gearwheel 212, such as by one or more fasteners. Alternatively, the ring gearwheel 313 and the first primary reduction gearset second gearwheel 212 may be configured in one common single piece.

As further shown in FIG. 2, the first planetary gearset 310 may be configured to be shiftable between the at least two gear states by selectively engaging and disengaging the sun gearwheel 311 of the first planetary gearset 310 to a housing H. In alternative examples, the ring gearwheel or the planet carrier may be selectively engaged and disengaged to the housing for providing a speed reduction. In the shown example, the direct gear state is provided by selectively engaging the sun gearwheel 311 to the ring gearwheel 313. In other words, the direct gear state may be achieved by selectively engaging any two members of the first planetary gearset 310 to each other.

The powertrain 100 may as shown comprise a first gear engaging member 314 for shifting the first planetary gearset 310 between the at least two gear states, wherein the first gear engaging member 314 is located axially offset from the sun gearwheel 311. Alternatively, as another non-limiting example, the first gear engaging member may be at least partly located radially inside a radially outer periphery of the sun gearwheel 311.

In the example shown in FIG. 2, the powertrain 100 further comprises a differential gearset 700 drivingly connected to the at least one drive shaft, e.g., the at two half-shafts 610, 620, and to the second planetary gearset 500, and provided downstream the second planetary gearset 500 and upstream from the at least one drive shaft 610, 620. The at least one drive shaft 610. 620, the second planetary gearset 500 and the differential gearset 700 may as shown be coaxially arranged and configured to rotate with respect to the common rotational axis A.

The power unit P1 in FIG. 2 comprises a stator arrangement 800, and the powertrain 100 is configured such that the first geometrical sectional plane S1 extends through the stator arrangement 800 and the first secondary reduction gearset 410. The stator arrangement 800 comprises a stator body 810 and end windings 820 arranged on opposite axial ends of the stator body 810, wherein the powertrain 100 is configured such that the first geometrical sectional plane S1 extends through the stator body 810 or through the end windings 820 at one of the axial ends.

Figure 3:
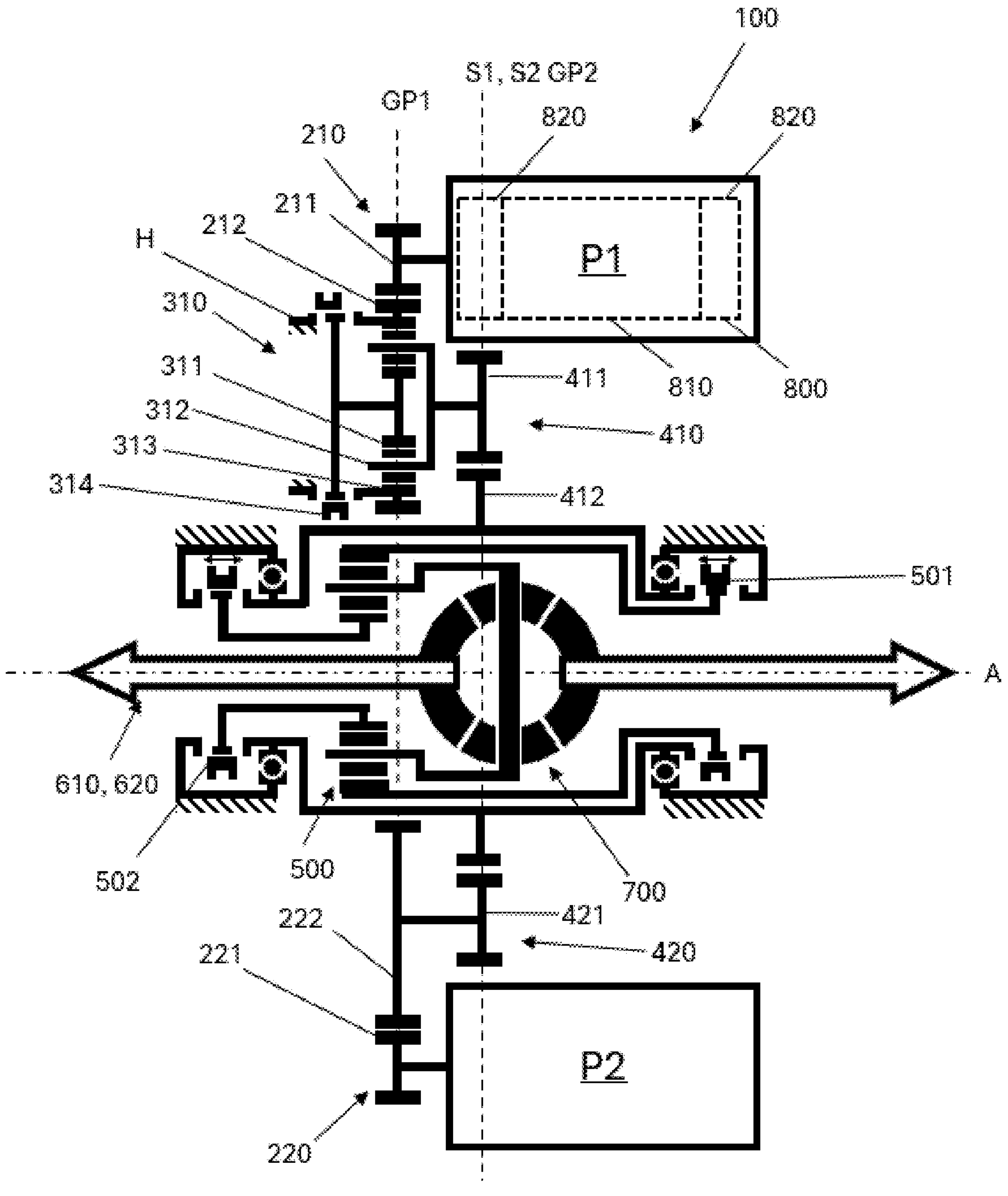
FIG. 3 is an exemplary powertrain in a schematic view according to an example.

FIG. 3 depicts an exemplary powertrain 100 in a schematic view according to another example, which for example may form part of the vehicle 1 shown in FIG. 1.

The powertrain 100 in FIG. 3 is similar to the powertrain 100 shown in FIG. 2, with the difference that it further comprises a second power unit P2, a second primary reduction gearset 220, and a second secondary reduction gearset 420. The second power unit P2 is also preferably an electric motor/generator.

The second power unit P2 is drivingly connected to the second primary reduction gearset 220 downstream from the second power unit P2.

The second primary reduction gearset 220 is drivingly connected to the second secondary reduction gearset 420 downstream from the second primary reduction gearset 220.

The second secondary reduction gearset 420 is drivingly connected to the second planetary gearset 500 downstream from the second secondary reduction gearset 420.

In addition, in the shown example, the powertrain 100 is configured such that a second geometrical sectional plane S2 extends through the second power unit P2 and the second secondary reduction gearset 420.

As shown in FIG. 3, the first and second geometrical planes S1, S2 may be the same plane.

The second primary reduction gearset 220 may as shown be configured to provide a constant non-shiftable speed reduction, and/or the second secondary reduction gearset 420 may be configured to provide a constant non-shiftable speed reduction.

The second primary reduction gearset 220 may as shown comprise at least two drivingly connected gearwheels 221, 222 which are arranged in a common second primary gear plane GP1 which is perpendicular to the common rotational axis A, and/or the second secondary reduction gearset 420 may comprise at least two drivingly connected gearwheels 421, 412 which are arranged in a common second secondary gear plane GP2 which is perpendicular to the common rotational axis A. As shown in e.g. FIG. 3, the common second primary gear plane GP1 may correspond to the common first primary gear plane GP1. In other examples, these planes may be offset from each other.

Figure 4:
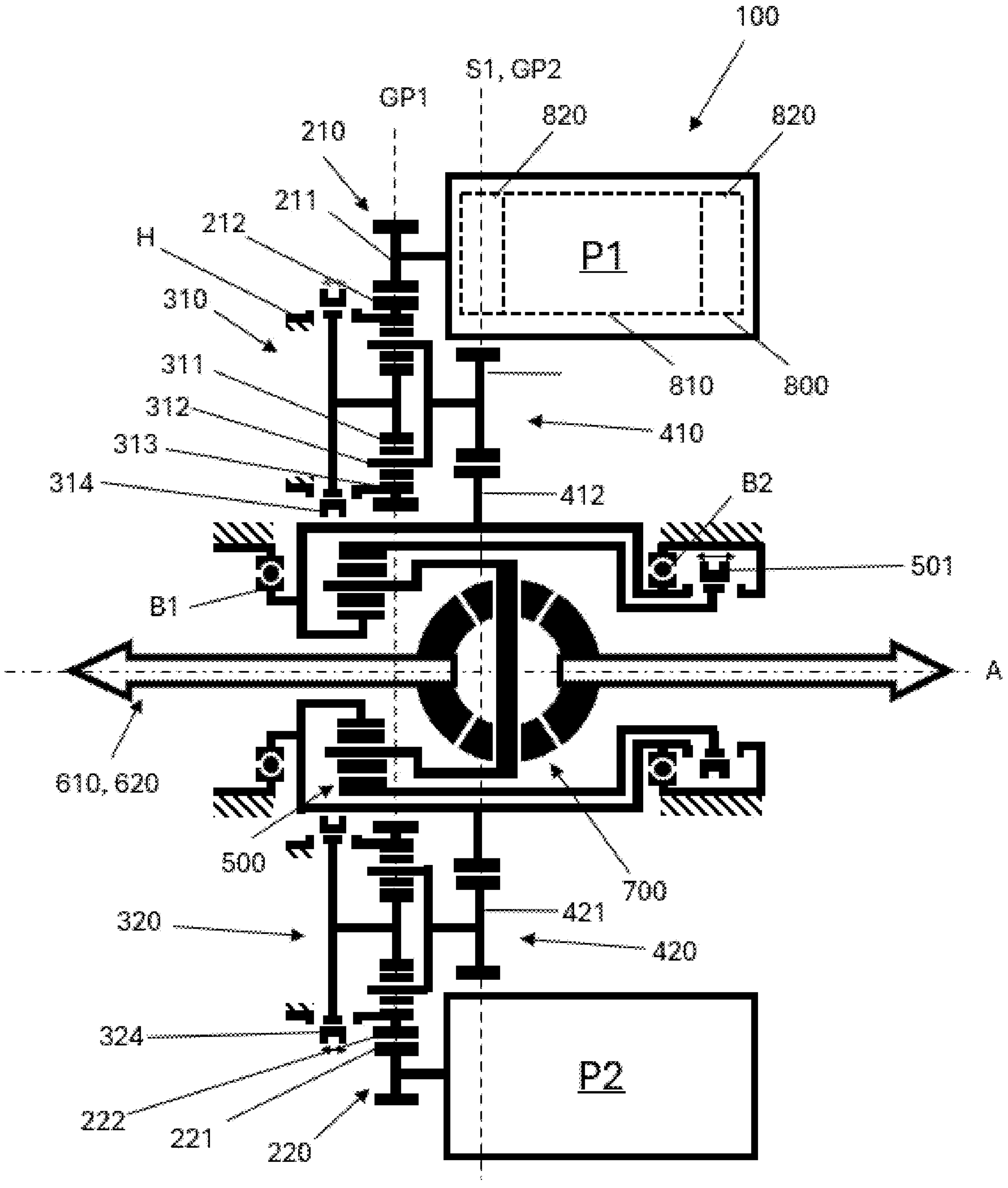
FIG. 4 is an exemplary powertrain in a schematic view according to an example.

FIG. 4 depicts an exemplary powertrain 100 in a schematic view according to another example, which for example may form part of the vehicle 1 shown in FIG. 1.

The powertrain 100 in FIG. 4 is similar to the powertrain 100 shown in FIG. 3, with the difference that it further comprises third planetary gearset 320. In the shown example, the third planetary gearset 320 is configured similarly to the first planetary gearset 310, i.e., it is shiftable between a direct gear state with a 1:1 speed ratio and a speed reduction gear state.

The second primary reduction gearset 220 is drivingly connected to the third planetary gearset 320 downstream from the second primary reduction gearset 220.

The third planetary gearset 320 is drivingly connected to the second secondary reduction gearset 420 downstream from the third planetary gearset 320.

As shown in FIG. 4, the at least two drivingly connected gearwheels 221, 222 of the second primary reduction gearset 220 may comprise a second primary reduction gearset first gearwheel 221 drivingly connected to a second primary reduction gearset second gearwheel 222. The second primary reduction gearset second gearwheel 222 is arranged downstream from the second primary reduction gearset first gearwheel 221, and the third planetary gearset 320 may as shown be arranged concentric with and at least partly radially inside a radially outer periphery of the second primary reduction gearset second gearwheel 222.

A respective rotational axis of any one of, preferably each one of, the second power unit P2 and the third planetary gearset 320 may as shown be parallel to the common rotational axis A.

As further shown in FIGS. 3 and 4, the first secondary reduction gearset 410 and the second secondary reduction gearset 420 may share a common gearwheel 412, and/or may be provided in a common gear plane GP2.

The third planetary gearset 320 may, similar to the first planetary gearset 310, comprise a gear engaging member 324 for shifting the third planetary gearset between the at least two gear states. In a similar manner, the second planetary gearset 500 may also comprise a gear engaging member 501 for shifting the second planetary gearset 500 between the at least two gear states. In the shown examples, the gear engaging member 501 selectively rotationally locks its ring gearwheel to the housing H or rotationally locks the ring gearwheel to the gearwheel 412 of the secondary reduction gearset 410. The second planetary gearset may as shown in FIG. 3 comprise a further gear engaging member 502 which selectively rotationally locks the sun gearwheel to the housing H or rotationally locks the sun gearwheel to the gearwheel 412 of the secondary reduction gearset 410. The gear engaging members as disclosed herein may for example be configured as sleeve members.

The common rotational axis A as shown in FIGS. 2-4 preferably extends in a direction along a transverse direction of the vehicle 1.

As further shown in FIGS. 2-4, the second planetary gearset 500 and the differential gearset 700 may be suspended by bearings B1, B2 provided on opposite sides of the differential gearset 700 and/or of the second planetary gearset 500, as seen along the common rotational axis A. The bearings B1, B2 may be any type of sliding or rolling bearing, such as a ball bearing and/or a roller bearing.

By a "driving connection" between two rotating parts is herein intended that torque can be transmitted between the parts, and that the rotational speeds of the parts are proportional. When two gearwheels are drivingly connected, torque can be transmitted between the gearwheels. This may be achieved by the gearwheels being in meshing engagement, or by a first gearwheel being in meshing engagement with a second gearwheel, which is in turn in meshing connection with a third gearwheel, or by a first gearwheel being in meshing engagement with a second gearwheel, which is rotationally connected to a third gearwheel, which is in turn in meshing connection with a fourth gearwheel. Thus, in order to be drivingly connected, it is not necessary that two gearwheels are in meshing engagement. It is sufficient that the rotation of one of the gearwheels inevitably leads to the rotation of the other one of the gearwheels.

In the following, possible features and feature combinations of the present disclosure are presented as a list of Examples.

Example 1: A powertrain (100) for a vehicle (1), comprising:

- a first power unit (P1),
- a first primary reduction gearset (210),
- a first planetary gearset (310), shiftable between at least two gear states, comprising a direct gear state with a 1:1 speed ratio and a speed reduction gear state,
- a first secondary reduction gearset (410),
- a second planetary gearset (500), shiftable between at least two gear states, comprising a direct gear state with a 1:1 speed ratio and at least one speed reduction gear state,
- at least one drive shaft (610, 620), preferably two half-shafts (610, 620),
- wherein the first power unit (P1) is drivingly connected to the first primary reduction gearset (210) downstream from the first power unit (P1),
- wherein the first primary reduction gearset (210) is drivingly connected to the first planetary gearset (310) downstream from the first primary reduction gearset (210),
- wherein the first planetary gearset (310) is drivingly connected to the first secondary reduction gearset (410) downstream from the first planetary gearset (310),
- wherein the first secondary reduction gearset (410) is drivingly connected to the second planetary gearset (500) downstream from the first secondary reduction gearset (410),
- wherein the second planetary gearset (500) is drivingly connected to the at least one drive shaft (610, 620) downstream from the second planetary gearset (500),
- wherein the at least one drive shaft (610, 620) and the second planetary gearset (500) are coaxially arranged and configured to rotate with respect to a common rotational axis (A), and wherein the powertrain (100) is configured such that a first geometrical sectional plane (S1) which is perpendicular to the common rotational axis (A) extends through the first power unit (P1) and the first secondary reduction gearset (410).

Example 2: The powertrain (100) according to Example 1, wherein a respective rotational axis of any one of, preferably each one of, the first power unit (P1) and the first planetary gearset (310) is parallel to the common rotational axis (A).

Example 3: The powertrain (100) according to any one of the preceding Examples, wherein the first primary reduction gearset (210) comprises at least two drivingly connected gearwheels (211, 212) which are arranged in a common first primary gear plane (GP1) which is perpendicular to the common rotational axis (A), and/or wherein the first secondary reduction gearset (410) comprises at least two drivingly connected gearwheels (411, 412) which are arranged in a common first secondary gear plane (GP2) which is perpendicular to the common rotational axis (A).

Example 4: The powertrain (100) according to Example 3, wherein the first primary reduction gearset (210) is configured such that a constant non-shiftable speed reduction is provided from the first power unit (P1) to the first planetary gearset (310), and/or wherein the first secondary reduction gearset (410) is configured such that a constant non-shiftable speed reduction is provided from the first planetary gearset (310) to the second planetary gearset (500).

Example 5: The powertrain (100) according to any one of Examples 3-4, wherein the at least two drivingly connected gearwheels (211, 212) of the first primary reduction gearset (210) comprises a first primary reduction gearset first gearwheel (211) drivingly connected to a first primary reduction gearset second gearwheel (212), the first primary reduction gearset second gearwheel (212) being arranged downstream from the first primary reduction gearset first gearwheel (211), and wherein the first planetary gearset (310) is arranged concentric with and at least partly radially inside a radially outer periphery of the first primary reduction gearset second gearwheel (212).

Example 6: The powertrain (100) according to Example 5, wherein the first planetary gearset (310) comprises a sun gearwheel (311), a planet carrier (312) carrying a plurality of planet gearwheels, and a ring gearwheel (313), wherein the ring gearwheel (313) is attached to the first primary reduction gearset second gearwheel (212), or the ring gearwheel (313) and the first primary reduction gearset second gearwheel (212) are configured in one common single piece.

Example 7: The powertrain (100) according to any one of the preceding Examples, wherein the first planetary gearset (310) comprises a sun gearwheel (311), a planet carrier (312) carrying a plurality of planet gearwheels, and a ring gearwheel (313), wherein the first planetary gearset (310) is configured to be shiftable between the at least two gear states by selectively engaging and disengaging the sun gearwheel (311) of the first planetary gearset (310) to a housing (H).

Example 8: The powertrain (100) according to Example 7, further comprising a first gear engaging member (314) for shifting the first planetary gearset (310) between the at least two gear states, wherein the first gear engaging member (314) is at least partly located radially inside a radially outer periphery of the sun gearwheel (311), or wherein the first gear engaging member (314) is located axially offset from the sun gearwheel (311).

Example 9: The powertrain (100) according to any one of the preceding Examples, further comprising a differential gearset (700) drivingly connected to the at least one drive shaft (610, 620) and to the second planetary gearset (500), and provided downstream the second planetary gearset (500) and upstream from the at least one drive shaft (610, 620), wherein the at least one drive shaft (610, 620), the second planetary gearset (500) and the differential gearset (700) are coaxially arranged and configured to rotate with respect to the common rotational axis (A).

Example 10: The powertrain (100) according to any one of the preceding Examples, wherein the power unit (P1) comprises a stator arrangement (800), and wherein the powertrain (100) is configured such that the first geometrical sectional plane (S1) extends through the stator arrangement (800) and the first secondary reduction gearset (410).

Example 11: The powertrain (100) according to Example 10, wherein the stator arrangement (800) comprises a stator body (810) and end windings (820) arranged on opposite axial ends of the stator body (810), wherein the powertrain (100) is configured such that the first geometrical sectional plane (S1) extends through the stator body (810) or through the end windings (820) at one of the axial ends.

Example 12: The powertrain (100) according to any one of the preceding Examples, further comprising a second power unit (P2), a second primary reduction gearset (220), and a second secondary reduction gearset (420), wherein the second power unit (P2) is drivingly connected to the second primary reduction gearset (220) downstream from the second power unit (P2), wherein the second primary reduction gearset (220) is drivingly connected to the second secondary reduction gearset (420) downstream from the second primary reduction gearset (220), wherein the second secondary reduction gearset (420) is drivingly connected to the second planetary gearset (500) downstream from the second secondary reduction gearset (420), and wherein the powertrain (100) is configured such that a second geometrical sectional plane (S2) extends through the second power unit (P2) and the second secondary reduction gearset (420).

Example 13: The powertrain (100) according to Example 12, wherein the second primary reduction gearset (220) is configured to provide a constant non-shiftable speed reduction, and/or wherein the second secondary reduction gearset (420) is configured to provide a constant non-shiftable speed reduction.

Example 14: The powertrain (100) according to Example 12 or 13, wherein the second primary reduction gearset (220) comprises at least two drivingly connected gearwheels (221, 222) which are arranged in a common second primary gear plane (GP1) which is perpendicular to the common rotational axis (A), and/or wherein the second secondary reduction gearset (420) comprises at least two drivingly connected gearwheels (421, 412) which are arranged in a common second secondary gear plane (GP2) which is perpendicular to the common rotational axis (A).

Example 15: The powertrain (100) according to any one of Examples 12-14, further comprising a third planetary gearset (320), wherein the second primary reduction gearset (220) is drivingly connected to the third planetary gearset (320) downstream from the second primary reduction gearset (220), and wherein the third planetary gearset (320) is drivingly connected to the second secondary reduction gearset (420) downstream from the third planetary gearset (320).

Example 16: The powertrain (100) according to Examples 14 and 15, wherein the at least two drivingly connected gearwheels (221, 222) of the second primary reduction gearset (220) comprises a second primary reduction gearset first gearwheel (221) drivingly connected to a second primary reduction gearset second gearwheel (222), the second primary reduction gearset second gearwheel (222) being arranged downstream from the second primary reduction gearset first gearwheel (221), and wherein the third planetary gearset (320) is arranged concentric with and at least partly radially inside a radially outer periphery of the second primary reduction gearset second gearwheel (222).

Example 17: The powertrain (100) according to any one of Examples 12-16, wherein a respective rotational axis of any one of, preferably each one of, the second power unit (P2) and the third planetary gearset (320) according to Example 15 or 16 is parallel to the common rotational axis (A).

Example 18: The powertrain (100) according to any one of Examples 12-17, wherein the first secondary reduction gearset (410) and the second secondary reduction gearset (420) share a common gearwheel (412), and/or are provided in a common gear plane (GP2).

Example 19: A vehicle (1) comprising a powertrain (100) according to any one of the preceding Examples.

Example 20: The vehicle (1) according to Example 19, wherein the common rotational axis (A) is extending in a direction along a transverse direction of the vehicle (1).

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A powertrain for a vehicle, comprising:

a first power unit, a first primary reduction gearset, a first planetary gearset, shiftable between at least two gear states, comprising a direct gear state with a 1:1 speed ratio and a speed reduction gear state, a first secondary reduction gearset, a second planetary gearset, shiftable between at least two gear states, comprising a direct gear state with a 1:1 speed ratio and at least one speed reduction gear state, at least one drive shaft, wherein the first power unit is drivingly connected to the first primary reduction gearset downstream from the first power unit, wherein the first primary reduction gearset is drivingly connected to the first planetary gearset downstream from the first primary reduction gearset, wherein the first planetary gearset is drivingly connected to the first secondary reduction gearset downstream from the first planetary gearset, wherein the first secondary reduction gearset is drivingly connected to the second planetary gearset downstream from the first secondary reduction gearset, wherein the second planetary gearset is drivingly connected to the at least one drive shaft downstream from the second planetary gearset, wherein the at least one drive shaft and the second planetary gearset are coaxially arranged and configured to rotate with respect to a common rotational axis, and wherein the powertrain is configured such that a first geometrical sectional plane which is perpendicular to the common rotational axis extends through the first power unit and the first secondary reduction gearset.

2. The powertrain according to claim 1, wherein a respective rotational axis of any one of the first power unit and the first planetary gearset is parallel to the common rotational axis.

3. The powertrain according to claim 1, wherein the first primary reduction gearset comprises at least two drivingly connected gearwheels which are arranged in a common first primary gear plane which is perpendicular to the common rotational axis, and/or wherein the first secondary reduction gearset comprises at least two drivingly connected gearwheels which are arranged in a common first secondary gear plane which is perpendicular to the common rotational axis.

4. The powertrain according to claim 3, wherein the first primary reduction gearset is configured such that a constant non-shiftable speed reduction is provided from the first power unit to the first planetary gearset, and/or wherein the first secondary reduction gearset is configured such that a constant non-shiftable speed reduction is provided from the first planetary gearset to the second planetary gearset.

5. The powertrain according to claim 3, wherein the at least two drivingly connected gearwheels of the first primary reduction gearset comprises a first primary reduction gearset first gearwheel drivingly connected to a first primary reduction gearset second gearwheel, the first primary reduction gearset second gearwheel being arranged downstream from the first primary reduction gearset first gearwheel, and wherein the first planetary gearset is arranged concentric with and at least partly radially inside a radially outer periphery of the first primary reduction gearset second gearwheel.

6. The powertrain according to claim 1, wherein the first planetary gearset comprises a sun gearwheel, a planet carrier carrying a plurality of planet gearwheels, and a ring gearwheel, wherein the first planetary gearset is configured to be shiftable between the at least two gear states by selectively engaging and disengaging the sun gearwheel of the first planetary gearset to a housing.

7. The powertrain according to claim 1, further comprising a differential gearset drivingly connected to the at least one drive shaft and to the second planetary gearset, and provided downstream the second planetary gearset and upstream from the at least one drive shaft, wherein the at least one drive shaft, the second planetary gearset and the differential gearset are coaxially arranged and configured to rotate with respect to the common rotational axis.

8. The powertrain according to claim 1, wherein the power unit comprises a stator arrangement, and wherein the powertrain is configured such that the first geometrical sectional plane extends through the stator arrangement and the first secondary reduction gearset.

9. The powertrain according to claim 1, further comprising a second power unit, a second primary reduction gearset, and a second secondary reduction gearset, wherein the second power unit is drivingly connected to the second primary reduction gearset downstream from the second power unit, wherein the second primary reduction gearset is drivingly connected to the second secondary reduction gearset downstream from the second primary reduction gearset, wherein the second secondary reduction gearset is drivingly connected to the second planetary gearset downstream from the second secondary reduction gearset, and wherein the powertrain is configured such that a second geometrical sectional plane extends through the second power unit and the second secondary reduction gearset.

10. The powertrain according to claim 9, wherein the second primary reduction gearset is configured to provide a constant non-shiftable speed reduction, and/or wherein the second secondary reduction gearset is configured to provide a constant non-shiftable speed reduction.

11. The powertrain according to claim 9, wherein the second primary reduction gearset comprises at least two drivingly connected gearwheels which are arranged in a common second primary gear plane which is perpendicular to the common rotational axis, and/or wherein the second secondary reduction gearset comprises at least two drivingly connected gearwheels which are arranged in a common second secondary gear plane which is perpendicular to the common rotational axis.

12. The powertrain according to claim 11, wherein the at least two drivingly connected gearwheels of the second primary reduction gearset comprises a second primary reduction gearset first gearwheel drivingly connected to a second primary reduction gearset second gearwheel, the second primary reduction gearset second gearwheel being arranged downstream from the second primary reduction gearset first gearwheel, and wherein a third planetary gearset is arranged concentric with and at least partly radially inside a radially outer periphery of the second primary reduction gearset second gearwheel.

13. The powertrain according to claim 9, further comprising a third planetary gearset, wherein the second primary reduction gearset is drivingly connected to the third planetary gearset downstream from the second primary reduction gearset, and wherein the third planetary gearset is drivingly connected to the second secondary reduction gearset downstream from the third planetary gearset.

14. The powertrain according to claim 9, wherein the first secondary reduction gearset and the second secondary reduction gearset share a common gearwheel, and/or are provided in a common gear plane.

15. A vehicle comprising a powertrain according to claim 1.

* * * * *